(12) United States Patent
Walliser (10) Patent No.: US 8,757,537 B2
(45) Date of Patent: *Jun. 24, 2014

(54) SYSTEMS AND METHODS FOR ROTOR/WING AIRCRAFT

(75) Inventor: Eric W. Walliser, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 1887 days.

This patent is subject to a terminal disclaimer.

(21) Appl. No.: 12/099,724

(22) Filed: Apr. 8, 2008

(65) Prior Publication Data

US 2009/0045294 A1    Feb. 19, 2009

Related U.S. Application Data

(63) Continuation-in-part of application No. 11/265,655, filed on Nov. 2, 2005, now Pat. No. 7,395,988.

(51) Int. Cl.
*B64C 27/82* (2006.01)

(52) U.S. Cl.
USPC .................................................. 244/17.19

(58) Field of Classification Search
USPC ....... 244/6, 7 A, 7 R, 12.4, 17.11, 17.19, 12.5
See application file for complete search history.

(56) References Cited

U.S. PATENT DOCUMENTS

| | | |
|---|---|---|
| 1,933,307 A | 10/1933 | Bolas |
| 2,526,941 A | 10/1950 | Fishbein |
| 2,621,001 A | 12/1952 | Roman |
| 2,679,364 A | 5/1954 | Del Pesaro |
| 2,708,081 A | 5/1955 | Dobson |
| 2,912,188 A | 11/1959 | Singelmann et al. |
| 2,917,895 A * | 12/1959 | Boushey ............... 60/39.35 |
| 2,940,691 A | 6/1960 | David |
| 2,941,749 A | 6/1960 | Sullivan et al. |
| 2,953,319 A | 9/1960 | Gluhareff |
| 3,038,683 A | 6/1962 | Rowe |
| 3,039,719 A | 6/1962 | Platt |
| 3,049,320 A | 8/1962 | Fletcher |
| 3,059,876 A | 10/1962 | Platt |
| 3,096,041 A | 7/1963 | Cheeseman et al |
| 3,112,901 A | 12/1963 | Kohman |
| 3,119,577 A | 1/1964 | Andrews |
| 3,156,434 A | 11/1964 | Harrington |
| 3,159,360 A | 12/1964 | Ryan et al. |
| 3,163,376 A | 12/1964 | Davidson |
| 3,227,399 A | 1/1966 | Dastoli et al. |
| 3,235,205 A | 2/1966 | Newcomb |
| 3,259,343 A | 7/1966 | Roppel |
| 3,273,339 A | 9/1966 | Borysthen-Tkacz |
| 3,278,138 A | 10/1966 | Haberkorn |
| 3,282,534 A | 11/1966 | Serriades et al. |
| 3,298,633 A | 1/1967 | Dastoli et al. |
| 3,318,097 A | 5/1967 | Wood et al. |
| 3,326,498 A | 6/1967 | Corning |
| 3,327,969 A | 6/1967 | Head |
| 3,329,376 A | 7/1967 | Sullivan |

(Continued)

*Primary Examiner* — Valentina Xavier (57) ABSTRACT

Systems and methods for rotor/wing aircraft are disclosed. In one embodiment, an aircraft includes an airframe, a high-lift canard and tail, a rotor/wing, a propulsion system, and a drive assembly. The drive assembly, which may include a radial inflow turbine, is configured to extract work from the propulsion system to selectively rotate the rotor/wing assembly thus enabling the aircraft to conduct rotary-wing flight, fixed wing flight as well as smoothly transition between the two modes of flight.

18 Claims, 8 Drawing Sheets

(56) References Cited

U.S. PATENT DOCUMENTS

| | | | |
|---|---|---|---|
| 3,368,778 | A | 2/1968 | Wilde et al. |
| 3,375,997 | A | 4/1968 | Gist |
| 3,381,474 | A | 5/1968 | Gist |
| 3,445,079 | A | 5/1969 | Burns |
| 3,454,241 | A | 7/1969 | Riemerschmid |
| 3,464,650 | A | 9/1969 | Girard |
| 3,490,720 | A | 1/1970 | Girard |
| 3,506,219 | A | 4/1970 | Mouille et al. |
| 3,514,051 | A | 5/1970 | Celayan |
| 3,514,052 | A | 5/1970 | McKeown |
| 3,515,500 | A | 6/1970 | Nachod |
| 3,517,898 | A * | 6/1970 | Laville et al. .............. 244/7 R |
| 3,567,157 | A | 3/1971 | Dancik |
| 3,582,021 | A | 6/1971 | Pender |
| 3,666,209 | A | 5/1972 | Taylor |
| 3,739,580 | A | 6/1973 | Bland et al. |
| 3,762,667 | A | 10/1973 | Pender |
| 3,792,827 | A * | 2/1974 | Girard .......................... 244/7 A |
| 3,794,273 | A | 2/1974 | Girard |
| 3,829,043 | A | 8/1974 | Benson |
| 3,907,219 | A | 9/1975 | Pharris |
| 3,972,490 | A | 8/1976 | Zimmermann et al. |
| 3,986,686 | A * | 10/1976 | Girard .......................... 244/7 A |
| 4,044,971 | A | 8/1977 | Pharris |
| 4,059,247 | A | 11/1977 | Prewitt |
| 4,280,660 | A * | 7/1981 | Wooten et al. ........... 239/265.35 |
| 4,469,294 | A | 9/1984 | Clifton |
| 4,530,640 | A * | 7/1985 | MacInnes ..................... 415/144 |
| 4,711,415 | A | 12/1987 | Binden |
| 4,713,935 | A * | 12/1987 | Szuminski et al. ............. 60/229 |
| 4,789,115 | A | 12/1988 | Koutsoupidis |
| 5,031,859 | A | 7/1991 | Cunningham |
| 5,086,993 | A | 2/1992 | Wainfan |
| 5,096,140 | A | 3/1992 | Dornier, Jr. et al. |
| 5,131,605 | A | 7/1992 | Kress |
| 5,174,523 | A | 12/1992 | Balmford |
| 5,405,105 | A | 4/1995 | Kress |
| 5,454,530 | A * | 10/1995 | Rutherford et al. ............ 244/7 A |
| 5,738,301 | A * | 4/1998 | Francois et al. ............ 244/17.19 |
| 5,758,844 | A | 6/1998 | Cummings |
| 5,799,901 | A | 9/1998 | Osder |
| 5,839,691 | A * | 11/1998 | Lariviere ....................... 244/7 R |
| 5,984,228 | A * | 11/1999 | Pham ................................ 244/2 |
| 6,050,520 | A | 4/2000 | Kirla |
| 6,131,849 | A | 10/2000 | Nyhus |
| 6,340,133 | B1 | 1/2002 | Capanna |
| 6,471,158 | B1 | 10/2002 | Davis |
| 6,622,962 | B1 * | 9/2003 | White ........................... 244/7 R |
| 6,659,394 | B1 | 12/2003 | Shenk |
| 6,789,764 | B2 | 9/2004 | Bass et al. |
| 6,896,221 | B1 | 5/2005 | Einarsson |
| 6,918,244 | B2 * | 7/2005 | Dickau ............................ 60/229 |
| 6,974,105 | B2 | 12/2005 | Pham |
| 7,014,142 | B2 * | 3/2006 | Barocela et al. .............. 244/7 R |
| 2003/0222171 | A1 | 12/2003 | Zoppitelli et al. |
| 2004/0026563 | A1 * | 2/2004 | Moller .......................... 244/12.4 |
| 2004/0056144 | A1 | 3/2004 | Bass et al. |
| 2004/0075017 | A1 | 4/2004 | Sash |
| 2004/0222329 | A1 | 11/2004 | Kuhns et al. |
| 2005/0127238 | A1 | 6/2005 | Ballew |
| 2005/0133662 | A1 * | 6/2005 | Magre ........................... 244/7 R |
| 2005/0230519 | A1 | 10/2005 | Hurley |
| 2005/0230520 | A1 | 10/2005 | Kusic |
| 2006/0022084 | A1 * | 2/2006 | Magre .......................... 244/12.4 |
| 2006/0157614 | A1 | 7/2006 | Simpson |
| 2008/0135677 | A1 * | 6/2008 | Oleshchuk et al. ......... 244/17.11 |
| 2010/0001120 | A1 * | 1/2010 | Sun .................................. 244/6 |

* cited by examiner

SYSTEMS AND METHODS FOR ROTOR/WING AIRCRAFT

CROSS REFERENCE TO RELATED APPLICATIONS

This patent application is a continuation-in-part application of commonly-owned U.S. patent application Ser. No. 11/265,655 entitled "Rotor-Wing Aircraft Having an Adjustable Tail Nozzle" filed on Nov. 2, 2005, now U.S. Pat. No. 7,395,988, which application and issued patent is incorporated herein by reference.

FIELD OF THE INVENTION

This disclosure relates to systems and methods for rotor/wing aircraft.

BACKGROUND

Higher performance rotary wing aircraft are sought. A stopped-rotor (or rotor/wing) aircraft like that shown in U.S. Pat. No. 3,327,969 offers the ability to hover like a helicopter plus the promise of achieving the high speeds of a fixed-wing aircraft by stopping the rotor's rotation while in flight and allowing it to act as a fixed wing.

Another prior art example of a stopped-rotor aircraft, the Canard Rotor/Wing (CRW) concept (U.S. Pat. No. 5,454,530), combines a reaction-driven, stoppable-rotor with a high-lift canard and tail. Exhaust gas from a common power plant (i.e. gas turbine engine) provides direct thrust required for fixed-wing flight and is routed to the blade tips to power the reaction-driven rotor for rotary-wing flight. Together the canard and tail provide all of the aircraft's lift during transition between rotary-wing and fixed-wing flight, thereby allowing the rotor to be unloaded during starting and stopping.

It is known that all reaction driven rotors have their own unique inefficiencies. Coriolis losses associated with accelerating the propulsive gases radially as the rotor blade spins consumes up to 40% of power available. Thus, stopped-rotor aircraft designs are sought that are more efficient than the reaction-driven, rotor/wing system of the CRW.

SUMMARY OF THE INVENTION

Embodiments of systems and methods for rotor/wing aircraft are disclosed.

In one embodiment, an aircraft includes an airframe, a rotor/wing, a high-lift canard and tail, a propulsion system, and a power-takeoff assembly that enable the aircraft to conduct rotary-wing flight, fixed wing flight and smoothly transition between the two modes. In some implementations, the aircraft may further include a rotatable aft nozzle that is configured to controllably vector engine thrust so as to supplement the lift required from the rotor/wing during rotary-wing flight.

In another embodiment, a drive assembly is replaced by a radial inflow turbine configured to extract work from the propulsion system for the purpose of rotating the rotor/wing to produce lift during rotary-wing flight. The radial inflow turbine can be selectively by-passed for the purpose of producing thrust during fixed-wing flight. A high-lift canard and tail enable smooth transition between the two modes. In further embodiments, a rotatable aft nozzle is included in the assembly with the radial inflow turbine.

The features, functions, and advantages that will be discussed can be achieved independently in various embodiments of the present disclosure or may be combined in yet other embodiments further details of which can be seen with reference to the following description and drawings.

BRIEF DESCRIPTION OF THE DRAWINGS

Embodiments of the present disclosure are described in detail below with reference to the following drawings.

DETAILED DESCRIPTION

Many specific details of certain embodiments of the disclosure are set forth in the following description and in FIGS. 1-12 to provide a thorough understanding of such embodiments. One skilled in the art, however, will understand that the present disclosure may have additional embodiments, or that the present disclosure may be practiced without several of the details described in the following description.

Figure 1:
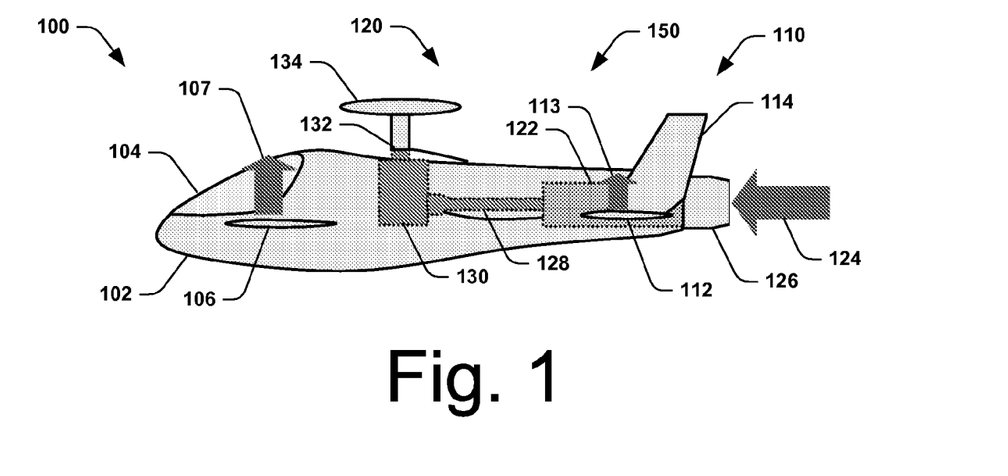
FIG. 1 is a side sectional view of an aircraft in a fixed-wing mode of operation in accordance with another embodiment of the present disclosure.

FIG. 1 is a side view of an aircraft 100 in a fixed-wing mode 150 of operation in accordance with an embodiment of the present disclosure. In this embodiment, the aircraft 100 includes a fuselage 102 of an airframe defining a cockpit portion 104. A canard 106 extends outwardly from each lateral side of the fuselage 102 (one visible). The aircraft 100 further includes a tail assembly 110 having a horizontal tail surface 112 that extends outwardly from each lateral side of the fuselage 102 (one visible), and a vertical tail surface 114 that extends upwardly from each horizontal tail surface 112 (one visible).

As further shown in FIG. 1, the aircraft 100 includes a propulsion system 120 having at least one engine 122 disposed within an aft portion of the fuselage 102 proximate the tail assembly 110. An engine exhaust flow from the engine 122 is directed through a nozzle assembly 126 to provide a primary thrust 124 for propelling the aircraft 100 in the fixed-wing mode 150 of operation. In the fixed-wing mode 150 of operation, a canard lift 107 is generated by each canard 106, and a tail lift 113 is generated by each horizontal tail surface 112.

A primary shaft 128 extends generally forwardly within the fuselage 102 from the engine 122 to a gearbox assembly 130. The primary shaft 128 may be driven by the engine 122 using a conventional power-takeoff configuration generally known in the art. A secondary shaft 132 extends generally upwardly from the gearbox assembly 130 to a rotor/wing assembly 134. In the fixed-wing mode 150 of operation shown in FIG. 1, the rotor/wing assembly 134 is held in a fixed position suitable for forward flight.

Figure 2:
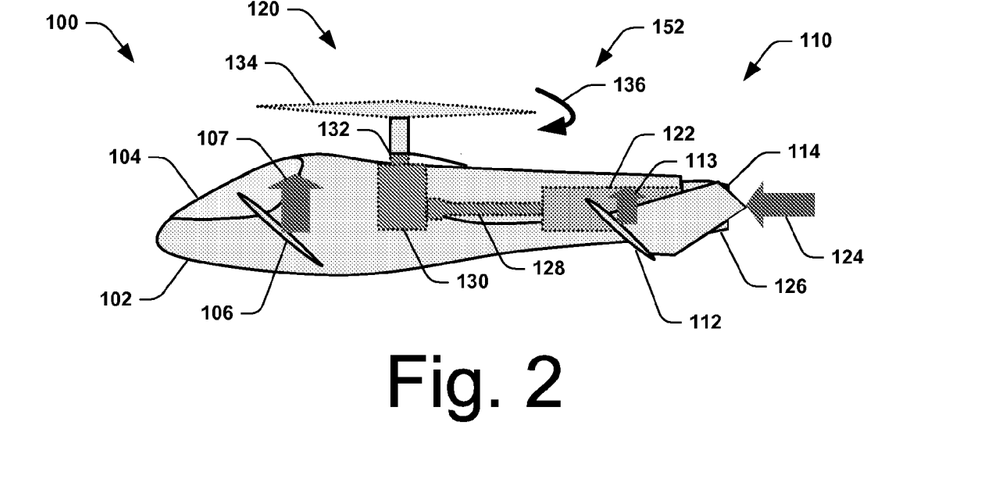
FIGS. 2 and 3 are side sectional views of the aircraft of FIG. 1 in conversion and rotary-wing flight modes of operation, respectively.

FIG. 2 shows the aircraft 100 of FIG. 1 in a conversion mode 152 of operation. In this embodiment, the primary wings (or canard) 106 and the tail assembly 110 are in the process of transitioning from the fixed-wing mode 150 of operation to a rotary-wing mode 154 (described below with respect to FIG. 3). More specifically, in some embodiments, each canard 106 and tail assembly 110 is pivotable between a first position (FIG. 1) configured to provide a lift force in the fixed-wing mode 150 of operation, and a second position (FIG. 3) configured to minimize a downward force in the rotary-wing mode 154 of operation.

In addition, rotation of the secondary shaft 132 has initiated rotation of the rotor/wing assembly 134 in a rotational direction 136. Comparison of FIG. 2 with FIG. 1 shows that the primary thrust 124 from the engine 122 is reduced in comparison with the fixed-wing mode 150 of operation. In the conversion mode 152 of operation, the lift from the canards 106 and the tail assembly 110 may continue to provide 100% of the lift required to maintain flight to allow the rotor/wing assembly 134 to start and stop while unloaded. The vertical tail surfaces 114 of the tail assembly 110 provide antitorque forces during the conversion mode 152 of operation.

Figure 3:
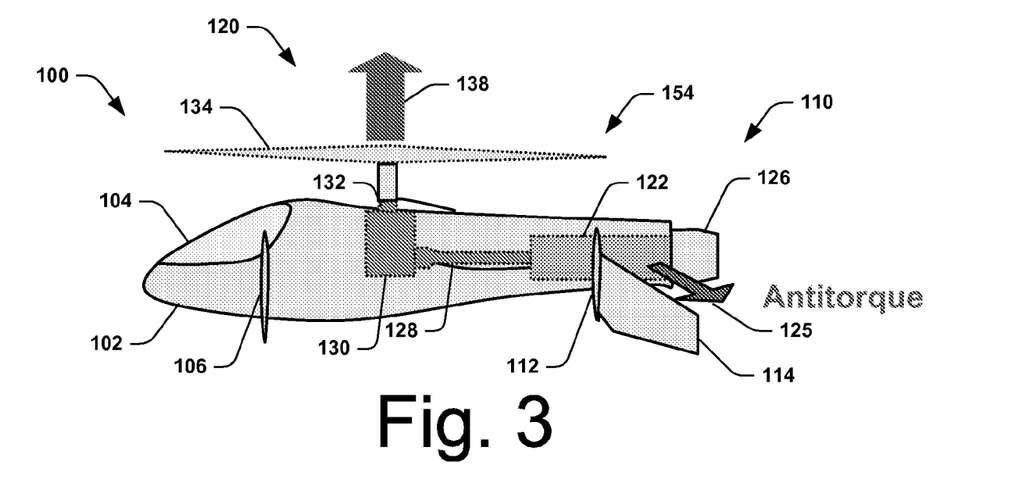

The aircraft 100 is shown operating in the rotary-wing mode 154 of operation in FIG. 3. In this embodiment, the canards 106 and the tail assembly 110 are fully pivoted from their respective positions in the fixed-wing mode 150 of operation (e.g. approximately 90 degrees) shown in FIG. 1. In addition, the rotational velocity of the primary shaft 128 has increased such that a primary lift component 138 from the rotor/wing assembly 134 is sufficient to support the aircraft 100 in vertical flight (ascent or descent) or hover as desired. Further, the primary thrust 124 from the engine 122 may be approximately zero, and a portion of the engine exhaust flow may be used as a yaw control (or anti-torque) flow 125 to counteract a torque generated by the rotation of the rotor/wing assembly 134. For example, the yaw control flow 125 may be exhausted through a yaw control nozzle to provide a control force having a laterally-directed component that counteracts the torque generated by the rotation of the rotor/wing assembly 134. More specifically, in some embodiments, the yaw control flow 125 may be directed through a yaw control system such as the NOTAR® system, or any other suitable yaw control system.

Figure 4:
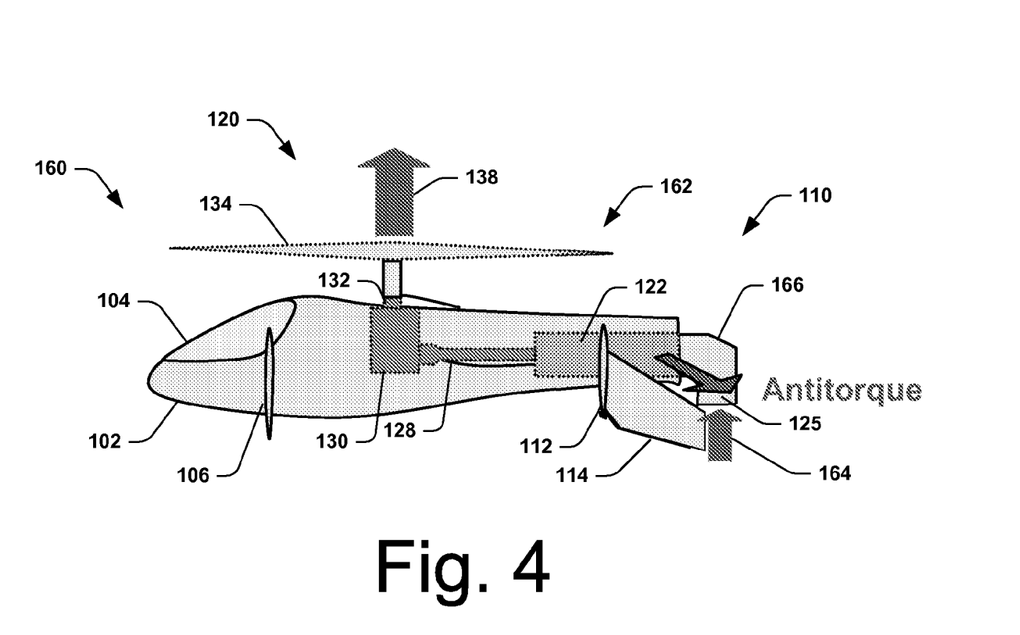
FIG. 4 is a side sectional view of an aircraft in a rotary-wing mode of operation in accordance with yet another embodiment of the present disclosure.

FIG. 4 is a side view of an aircraft 160 in a rotary-wing mode 162 of operation and is shown as an enhancement to the first embodiment of the present disclosure. Many of the components of the aircraft 160 shown in FIG. 4 are similar or identical to the components of the aircraft 100 described above with respect to FIGS. 1 through 3, and therefore, for the sake of brevity, a description of such components will not be repeated. In this embodiment, however, the aircraft 160 includes a vectorable nozzle 166 that is configured to controllably vector an engine thrust component 164 from approximately horizontal in the fixed-wing mode 150 to approximately vertical in the rotary-wing mode 154 (FIG. 4). Thus, in addition to the primary lift components 138 generated by the rotor/wing assembly 134, the aircraft 160 may also rely upon the engine thrust component 164 during the rotary-wing mode 162 of operation. When the aircraft 160 returns to the fixed-wing mode 150 of operation (FIG. 1), the vectorable nozzle 166 may be returned to a generally aftward-facing direction to provide the generally horizontal thrust 124 needed for forward flight as shown in FIG. 1.

Figure 5:
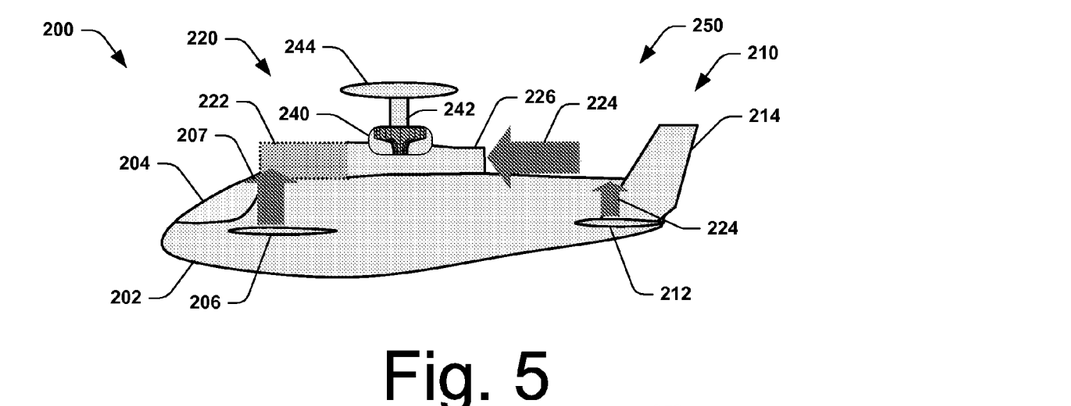
FIG. 5 is a side sectional view of an aircraft in a fixed-wing mode of operation in accordance with another alternate embodiment of the present disclosure.
Figure 6:
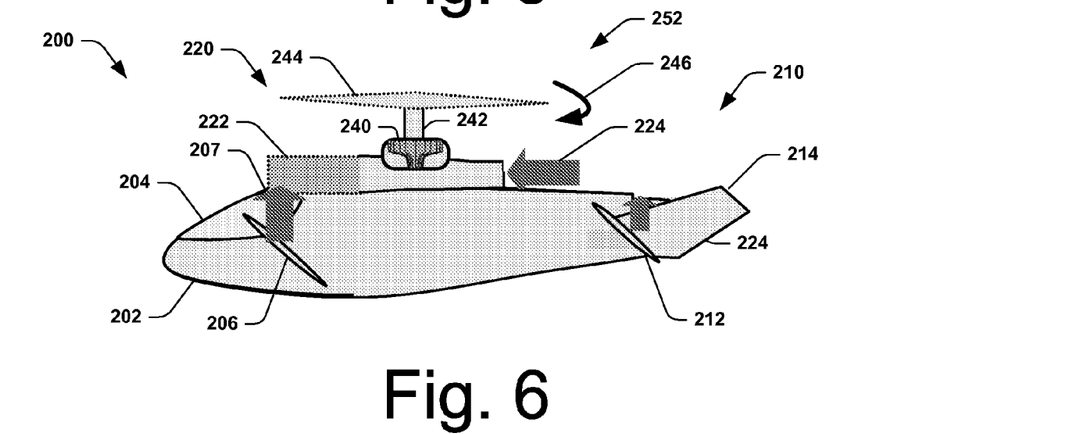
FIGS. 6 and 7 are side sectional views of the aircraft of FIG. 5 in conversion and rotary-wing flight modes of operation, respectively.
Figure 7:
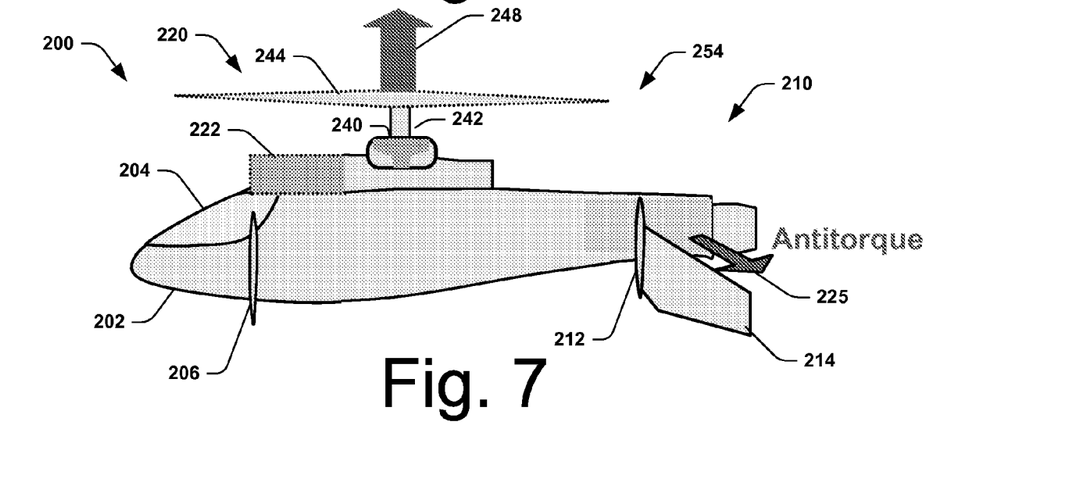

FIGS. 5 through 7 are side sectional views of an aircraft 200 in accordance with another embodiment of the present disclosure. More specifically, in FIG. 5, the aircraft 200 is shown in a fixed-wing mode 250 of operation. The aircraft 200 includes a fuselage (or airframe) 202 defining a cockpit portion 204, and having canards 206 that extend outwardly from each lateral side of the fuselage 202 (one visible). The aircraft 200 further includes a tail assembly 210 having a horizontal tail surface 212 that extends outwardly from each lateral side of the fuselage 202 (one visible), and a vertical tail surface 214 that extends upwardly from each horizontal tail surface 212 (one visible).

As further shown in FIG. 5, the aircraft 200 includes a propulsion system 220 having at least one engine 222 coupled to (or disposed within) a dorsal (or upper) portion of the fuselage 202. An engine exhaust flow from the engine 222 is directed through a nozzle assembly 226 to provide a primary thrust 224 for propelling the aircraft 200 in the fixed-wing mode 250 of operation. In the fixed-wing mode 250, a canard lift 207 is generated by each canard 206, and a tail lift 213 is generated by each horizontal tail surface 212.

Figure 10:
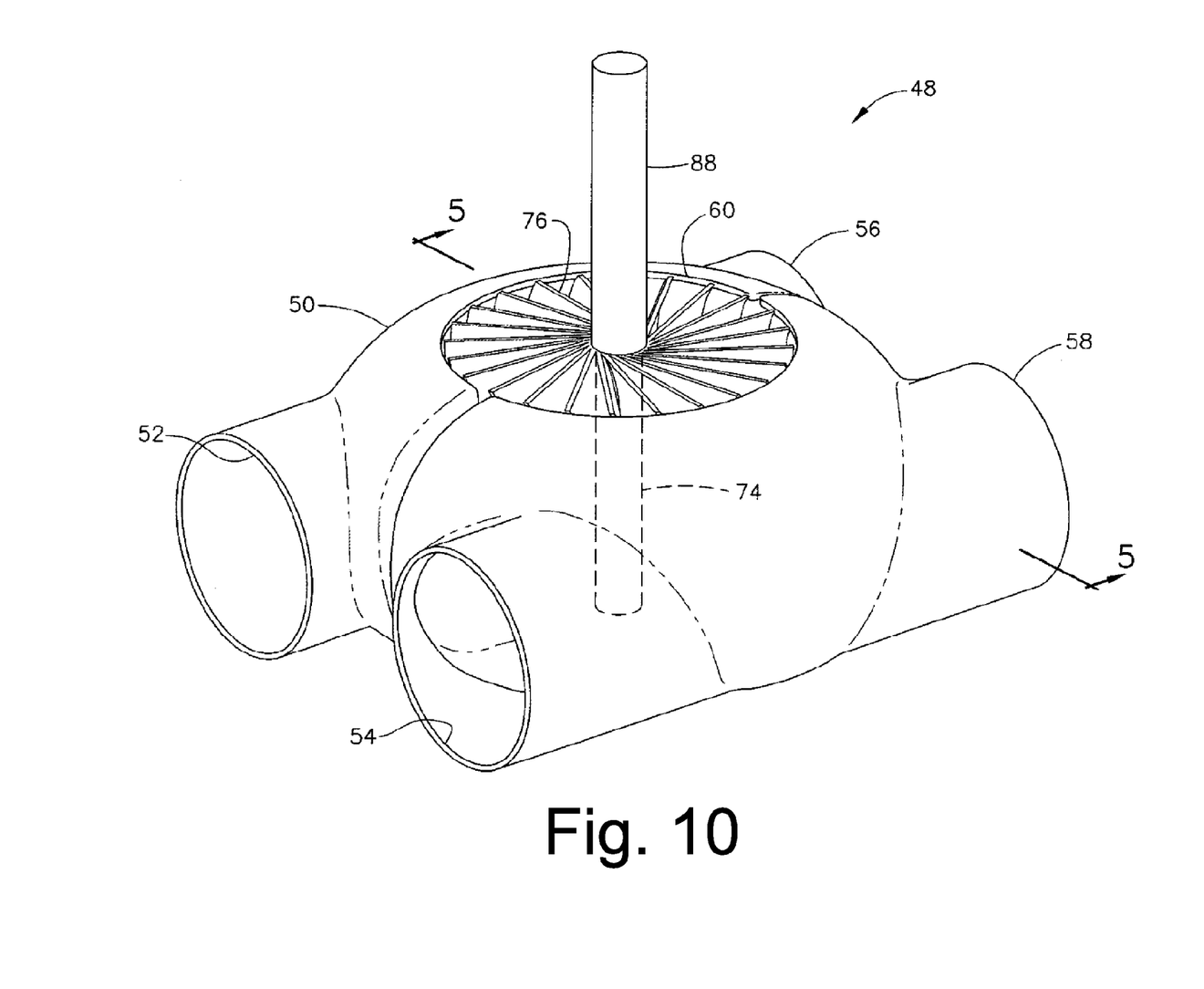
FIG. 10 is a perspective of a radial inflow turbine according to another embodiment of the present disclosure.
Figure 11:
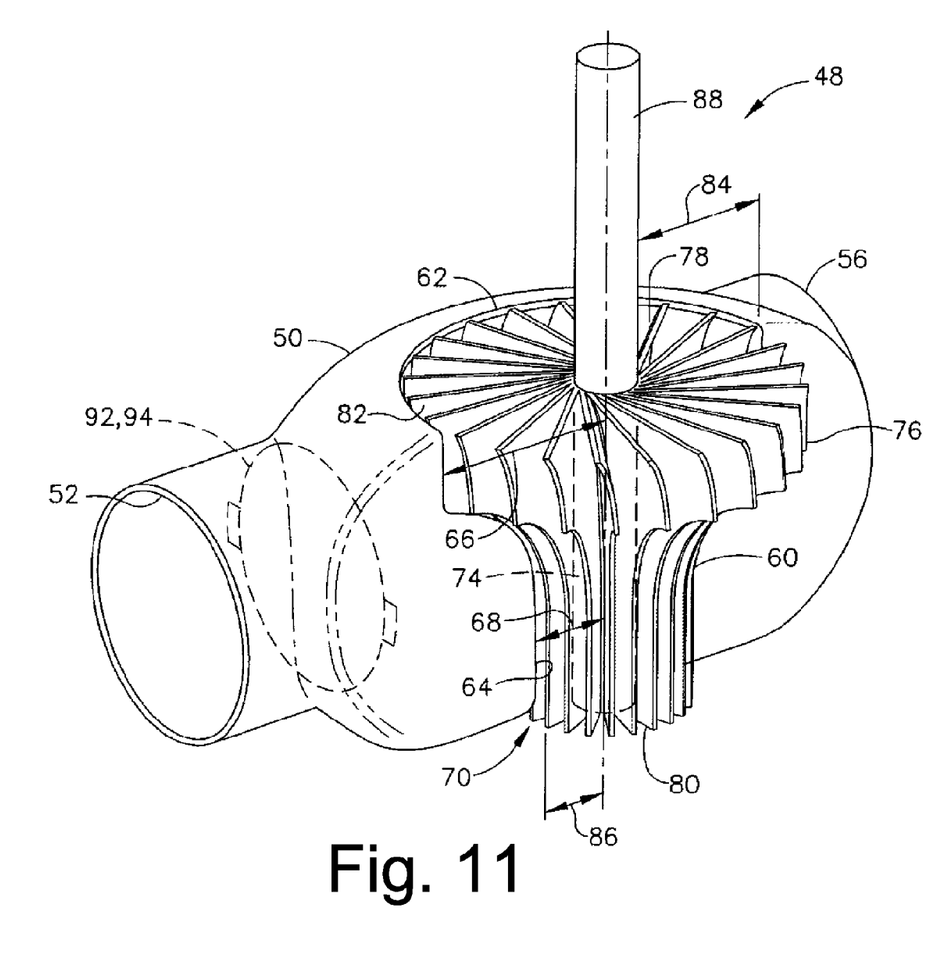
FIG. 11 is a perspective of the radial inflow turbine of FIG. 10 shown without half of a body of the radial inflow turbine.
Figure 12:
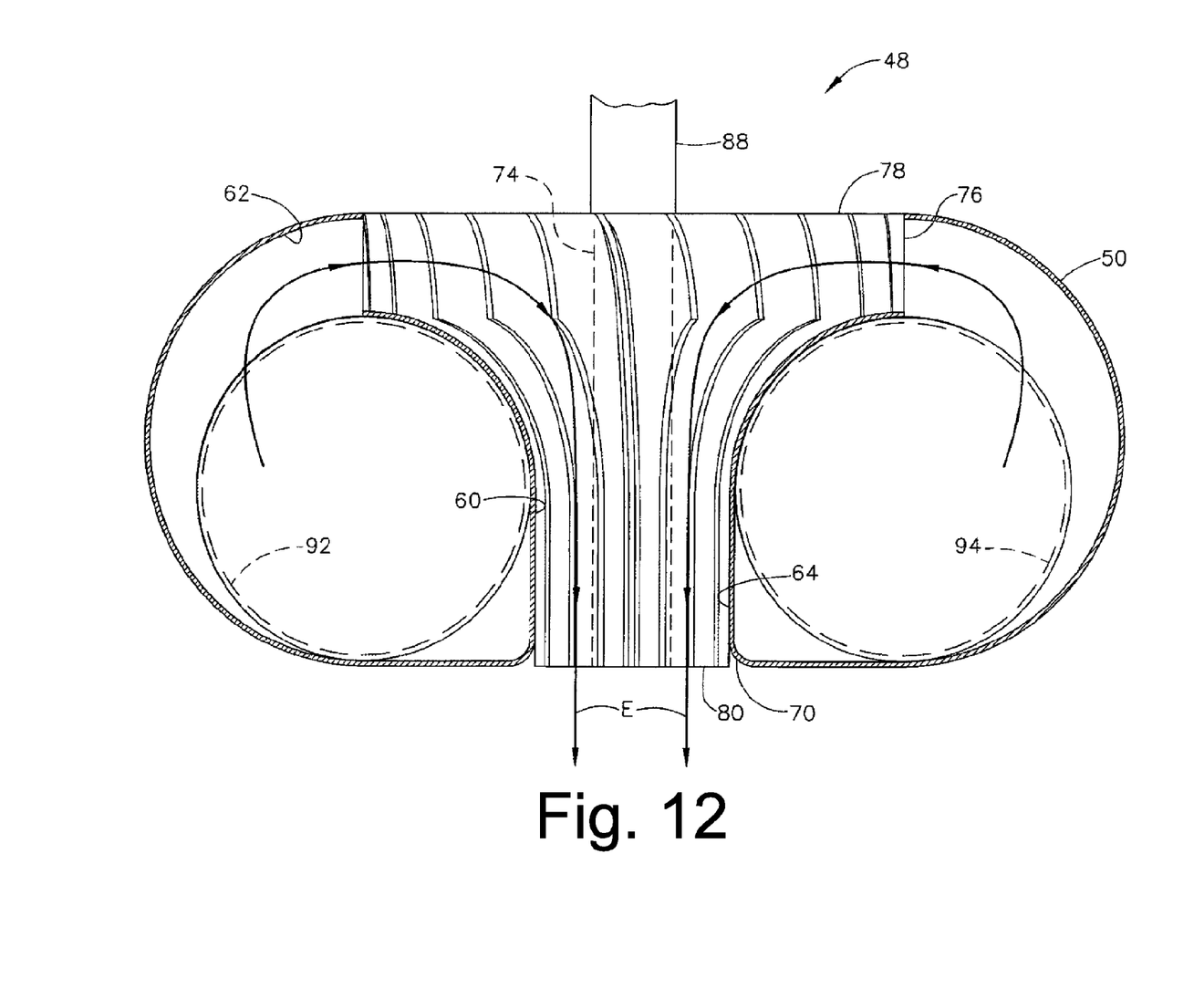
FIG. 12 is a cross section taken along lines 5-5 of FIG. 10.

A radial inflow turbine 240 is positioned aft of the engine 222. In some embodiments, the radial inflow turbine 240 is of a type as generally described more fully below with respect to FIGS. 10 through 12. More specifically, in particular embodiments, the aircraft 200 includes two engines 222 in a laterally-spaced (or side-by-side) arrangement (one visible), and the radial inflow turbine 240 is configured as shown in FIGS. 10 through 12. A drive shaft 242 extends generally upwardly from the radial inflow turbine assembly 240 to a rotor/wing assembly 244. In the fixed-wing mode 250 of operation shown in FIG. 5, the rotor/wing assembly 244 is held in a fixed position suitable for forward flight.

FIG. 6 shows the aircraft 200 of FIG. 5 in a conversion mode 252 of operation. In this embodiment, the canards 206 and the tail assembly 210 have started pivoting as described above with respect to the embodiment shown in FIG. 2. Rotation of the drive shaft 242 has initiated rotation of the rotor/wing assembly 244 in a rotational direction 246. In the conversion mode 252 of operation, the lift from the canards 206 and the tail assembly 210 may continue to provide 100% of the lift required to maintain flight during transition to allow the rotor/wing assembly 244 to start and stop while unloaded. The vertical tail surfaces 214 of the tail assembly 210 provide antitorque forces during the conversion mode 252 of operation.

FIG. 7 shows the aircraft 200 in the rotary-wing mode 254 of operation, in which the canards 206 and the tail assembly 210 have fully pivoted as described above with respect to the embodiment shown in FIG. 3. In this embodiment, the rotational velocity of the drive shaft 242 has increased such that the rotor/wing assembly 244 is rotating at sufficient velocity to generate a primary lift component 238 from the rotor/wing assembly 244 sufficient to support the aircraft 200 in vertical flight (ascent or descent) or hover. A portion of the engine exhaust flow may be used as a yaw control (or anti-torque) flow 225 to counteract a torque generated by the rotation of the rotor/wing assembly 244 using a suitable yaw control system.

Figure 8:
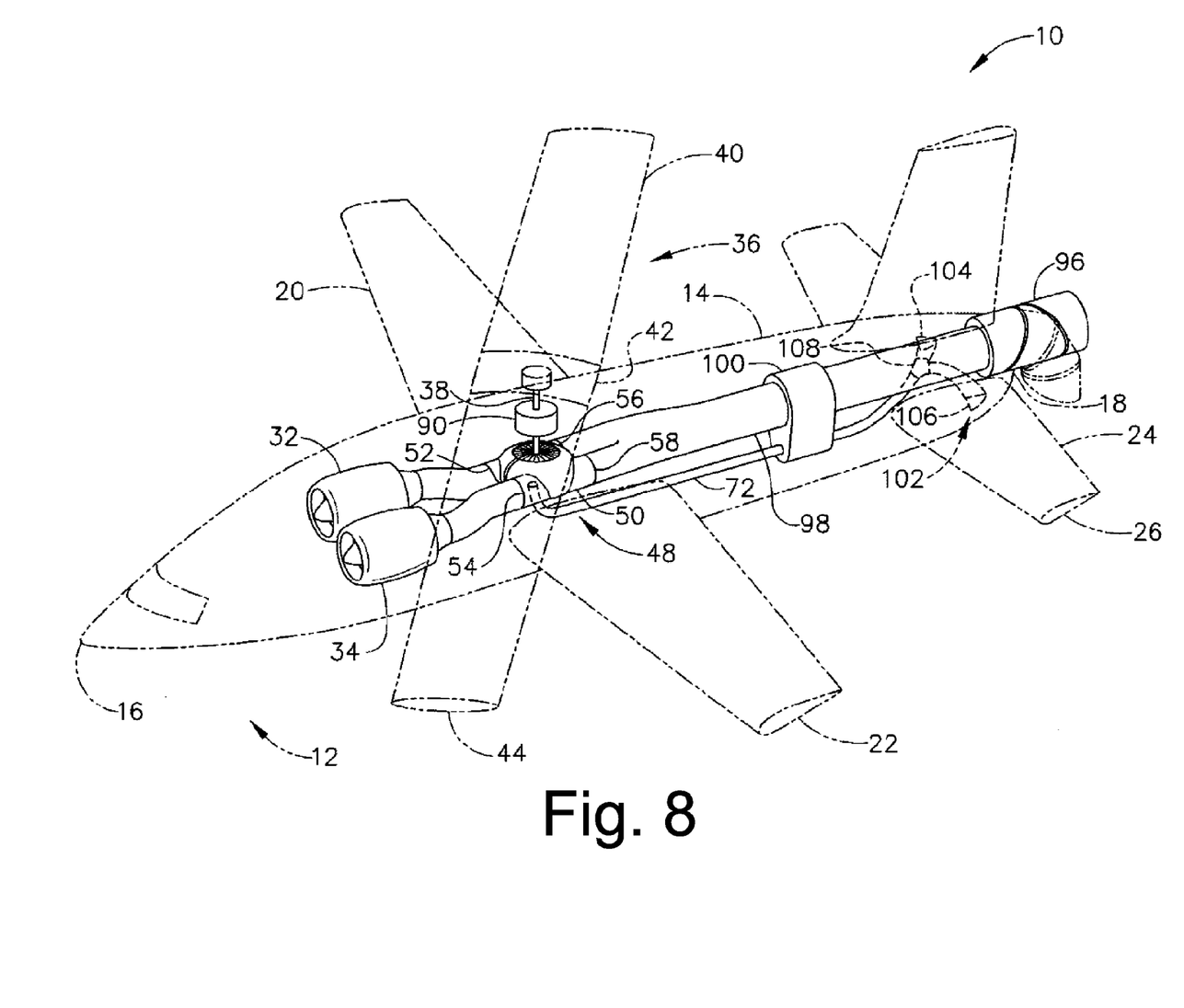
FIG. 8 is a perspective of an aircraft according to an embodiment of the present disclosure.

Referring to FIG. 8, an aircraft according to another embodiment of the present disclosure is designated in its entirety by reference number 10. In this embodiment, the aircraft 10 has an airframe, generally designated by 12, which includes a fuselage 14 having a nose or forward end 16 and a tail or aft end 18. The aircraft 10 further includes at least two primary fixed wings or canards 20 extending laterally from the fuselage. Each primary fixed wing 20 has a wing tip 22 opposite the fuselage 14. The aircraft 10 may also include a rear set of fixed wings 24. Each rear fixed wing 24 has a wing tip 26 opposite the fuselage 14.

The specific dimensions of the components of the aircraft 10 may vary considerably from embodiment to embodiment. For example, although the fuselage 14 may have other lengths extending between the forward end 16 and the aft end 18 without departing from the scope of the present disclosure, in some embodiments the fuselage 14 has a length of between about 60 feet and about 70 feet. Similarly, in some embodiments the aircraft 10 may have a canard span of between about 35 feet and about 45 feet, and in further embodiments, the rear wingspan may be between about 30 feet and about 40 feet.

The fixed wings 20, 24 may fold or pivot. For example, in one embodiment each of the fixed wings 20, 24 has a chord 28, 30 and the fixed wings are pivotally mounted on the fuselage 14 for selective movement between a fixed-wing flight position, in which the respective chord extends generally horizontally, and a rotary-wing flight position, in which the respective chord extends generally vertically. The forward flight position of the fixed wings 20, 24 is shown by solid lines in FIG. 9 and generally indicated by reference arrow F and the vertical flight position is shown by dashed lines and generally indicated by reference arrow V. The fixed wings 20, 24 may also be moved to intermediate flight positions (not shown) between the forward and vertical flight positions wherein the respective wing chord 28, 30 is between horizontal and vertical.

As shown in FIG. 8, in this embodiment, the aircraft 10 further includes one or more power plants 32, 34 mounted on the airframe. The power plants 32, 34 produce power in the form of hot high-pressure gas or exhaust during their operation. Although the power plants 32, 34 may produce other amounts of power without departing from the scope of the present disclosure, in some embodiments the power plants produce between about 11,000 pounds and about 13,000 pounds of thrust. Although other power plants 32, 34 may be used without departing from the scope of the present disclosure, in one embodiment each power plant is a F404 Turbofan available from General Electric Company of Cincinnati, Ohio.

The aircraft 10 also includes at least one rotor/wing, generally designated by 36, rotatably mounted on the aircraft by way of a drive shaft 38. The rotor/wing 36 includes a plurality of blades 40 extending radially from a central hub 42 that is connected to the drive shaft 38 to a blade tip 44. In one embodiment, the rotor/wing 36 has two primary blades 40 extending from the hub 42 in opposite directions from each other. Although the blades 40 may have other lengths between the hub 42 and the respective blade tips 44, in one embodiment each blade has a length of between about 30 feet and about 35 feet. Because the blades 40 and the drive shaft 38 do not need to be configured for routing exhaust, the blades and drive shaft can be thinner and lighter than the blades and rotor mast of reaction-drive rotor/wing aircraft. The reduced weight and drag characteristics of the rotor/wing 36 improves aircraft 10 performance and lowers power requirements compared to reaction-drive systems. Although the blades 40 may have other maximum thicknesses 46 without departing from the scope of the present disclosure, in one embodiment each blade has a maximum thickness of between about 1 foot and about 2 feet. Although the rotor blades 40 may be made of other materials, in one embodiment at least a portion of the blades are made of a polymer composite.

The aircraft 10 has a rotation mode wherein the rotor/wing 36 is rotated by the power plants 32, 34 and a fixed mode wherein the rotor/wing is locked to prevent rotor/wing rotation. In the rotation mode, the rotor/wing 36 rotates to provide upward thrust to the aircraft 10. The primary fixed wings 20 are moved to their vertical flight position V when the aircraft 10 is in the rotation mode so the primary fixed wings minimally interfere with rotor 36 downwash and thus minimally inhibit the production of upward thrust by the rotor. The rear fixed wings 24 are also rotated to their vertical flight position when the aircraft 10 is in the rotation mode so they minimally inhibit upward propulsion. In the fixed mode, the rotor/wing 36 is locked so the blades 40 extend laterally to provide aerodynamic lift to the aircraft 10 during forward flight. The aircraft 10 may also fly at intermediate flight modes wherein the aircraft is propelled at an angle between vertical and horizontal. For example, an aircraft 10 transitioning between vertical and horizontal flight will fly at angles between vertical and horizontal. The fixed wings 20, 24 are moved to their forward flight positions F when the aircraft 10 is in the fixed mode and can assume intermediate flight positions corresponding to intermediate flight modes.

The aircraft 10 also includes a radial inflow turbine, generally designated by 48, mounted on the airframe 12 in fluid communication with the power plants 32, 34 for receiving exhaust from the power plants. The radial inflow turbine 48 is mechanically connected to the rotor/wing 36 and converts exhaust from the power plants 32, 34 to mechanical power for rotating the rotor/wing during operation of the aircraft 10. Losses incurred in converting the exhaust to mechanical power for rotating the rotor/wing 36 are generally lower than the losses incurred between the power plant(s) and the rotor/wing in a conventional reaction-drive rotor/wing system. The higher efficiency of the radial inflow radial inflow turbine 48 system according to the present disclosure enables high performance and uses less power than is required for reaction-drive systems. As shown in FIG. 10, the radial inflow radial inflow turbine 48 includes a body or housing 50 forming a first inlet 52 and a second inlet 54. As shown in FIG. 8, the first and second inlets 52, 54 are in fluid communication with the first and second power plants 32, 34, respectively. The turbine body 50 also forms a first aft outlet 56 and a second aft outlet 58 downstream from the first and second inlets 52, 54, respectively.

In addition, the turbine body 50 forms an annular vortical plenum or chamber 60 in fluid communication with the inlets 52, 54 and outlets 56, 58. As shown in FIG. 11, the vortical chamber 60 has an upper portion 62 and a lower portion 64. Although the upper portion 62 of the vortical chamber 60 may have other minimum radii 66 without departing from the scope of the present disclosure, in one embodiment the upper portion has a minimum radius of between about 20 inches and about 22 inches. Although the lower portion 64 of the vortical chamber 60 may have other maximum radii 68 without departing from the scope of the present disclosure, in one embodiment the lower portion has a maximum radius of between about 7 inches and about 9 inches. The radial inflow radial inflow turbine 48 further includes a chamber outlet 70 downstream from the vortical chamber 60. Exhaust from the power plants 32, 34 passing through the vortical chamber 60 exits the radial inflow turbine 48 with reduced energy by way of the chamber outlet 70. Upon exiting the chamber outlet 70, the exhaust flows into a low-energy conduit 72, as shown in FIG. 8.

The radial inflow turbine 48 also includes a hub 74 rotatably connected to the turbine body 50 and a plurality of vanes 76 extending radially outward from the hub. The hub 74 and the vanes 76 are positioned in the turbine vortical chamber 60. Each of the vanes 76 includes a top 78 positioned in the upper portion 62 of the vortical chamber 60 and a bottom 80 positioned in the lower portion 64 of the vortical chamber. Each vane 76 is pitched from its top 78 to its bottom 80. As will be appreciated by those skilled in the art, the pitch of the vanes 76 creates an oblique surface 82 against which power plant 32, 34 exhaust is directed to cause the vanes 76 and hub 74 to rotate during operation of the aircraft 10 in the rotation mode. In one embodiment, each vane 76 has a maximum radius 84 corresponding to the minimum radius 66 of the upper portion 62 of the vortical chamber 60 and a minimum radius 86 corresponding to the maximum radius 68 of the lower portion 64 of the vortical chamber. The radial inflow turbine 48 further includes a turbine shaft 88 operatively connected to the turbine hub 74 and to the rotor/wing drive shaft 38. In one embodiment, the rotor/wing drive shaft 38 and the turbine shaft 88 are integrally formed. The turbine hub 74, the vanes 76, and the turbine shaft 88 rotate together and the rotor/wing 36 is rotated by torque received from the turbine shaft during operation of the aircraft 10.

As shown in FIG. 8, the aircraft 10 may include a gearbox 90 connected to the turbine shaft 88 and the rotor/wing drive shaft 38 for transmitting power transferred from the turbine shaft to the drive shaft. In one embodiment, the gearbox 90 is a reduction gearbox for reducing the power and rotational speed imparted to the drive shaft 38 from the turbine shaft 88. In one embodiment, the gearbox 90 is a planetary gearbox. Although other types of gearboxes 90 may be used without departing from the scope of the present disclosure, in one embodiment the gearbox is an accessory gearbox available from Northstar Aerospace Inc of Bedford Park, Ill. The gearbox 90 may have one or more stages and although the gearbox 90 may have other reduction ratios without departing from the scope of the present disclosure, in one embodiment the gearbox has a reduction ratio of between about 7:1 and about 9:1.

As shown in FIGS. 11 and 12, the radial inflow turbine 48 further includes an inlet valve 92, 94 positioned within the turbine body 50 adjacent to each inlet 52, 54. Although the inlet valves 92, 94 may be other types without departing from the scope of the present disclosure, in one embodiment each valve is a butterfly valve (also known as a sliding door valve) or a ball valve. The inlet valves 92, 94 selectively allow power plant 32, 34 exhaust to pass through the radial inflow turbine 48 from the respective inlet 52, 54 to the corresponding aft outlet 56, 58 for high-speed flight in the fixed mode or direct the exhaust through the vortical chamber 60 for flight in the rotation mode. For directing power plant 32, 34 exhaust through the vortical chamber 60, the exhaust is first diverted from the respective inlet 52, 54 generally upward into the upper portion 62 of the vortical chamber 60 by the respective inlet valve 92, 94, then the exhaust flows generally radially inward in the vortical chamber and generally downward through the vortical chamber and against the oblique surfaces 82 of the vanes 76, as shown by arrow E in FIG. 12. As described above, the exhaust flowing against the oblique surfaces 82 of the vanes 76 causes the vanes and turbine hub 74 to rotate thereby rotating the turbine shaft 88, the drive shaft 38, and the rotor/wing 36.

For embodiments having a single power plant (not shown), the radial inflow turbine 48 can be configured in a variety of ways. For example, the turbine 48 may include a sole inlet positioned at about a center of an upstream end of the turbine for transferring exhaust from a single power plant to the vortical chamber and a sole outlet positioned at about a center of a downstream end of the turbine. It is contemplated that in one embodiment (not shown), the exhaust from two or more power plants are combined upstream from the turbine and enter the turbine through a sole turbine inlet.

Figure 9:
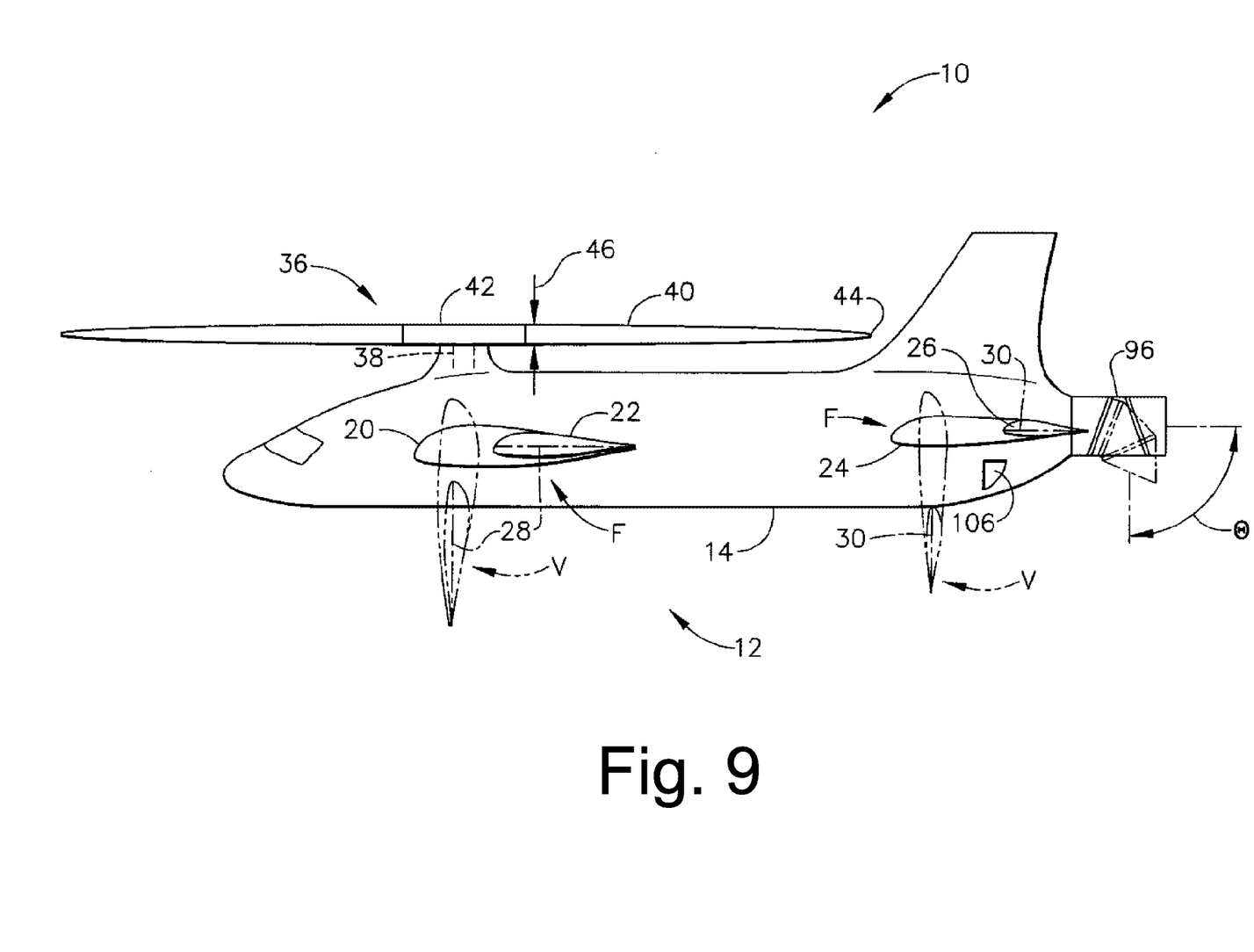
FIG. 9 is a side view of the aircraft of FIG. 8.

As shown in FIGS. 8 and 9, the aircraft 10 further comprises a nozzle 96 mounted on the airframe 12 adjacent to the aft end 18 of the fuselage 14. The nozzle 96 is in fluid communication with the power plants 32, 34 for receiving exhaust. The nozzle 96 may be operatively connected to each aft outlet 56, 58 of the radial inflow turbine 48 for receiving power plant 32, 34 exhaust exiting the aft outlets for high-speed flight in the fixed mode. For example, a high-energy conduit 98 (shown in FIG. 8) may connect the aft outlets 56, 58 to the nozzle 96. The nozzle 96 may also be operatively connected to the chamber outlet 70 for receiving exhaust during aircraft 10 operation. For example, the aircraft 10 may further comprise a conduit valve 100 for selectively diverting exhaust flowing through the low-energy conduit 72 to the high-energy conduit 98 and to the nozzle.

The nozzle 96 may be adjustable between multiple positions to provide thrust in various directions. In one embodiment, the nozzle 96 selectively directs exhaust to exit the aircraft 10 at a pre-selected angle E (shown in FIG. 9) with respect to the airframe 12 within a range of angles extending from about horizontally rearward (i.e., $\theta$ is about 0°), as shown by solid lines, and about vertically downward (i.e., $\theta$ is about 90°), as shown by dashed lines. When the nozzle 96 is angled rearward, the exhaust exiting the aircraft 10 provides forward thrust and when the nozzle is angled downward, the exhaust provides upward thrust. When the nozzle 96 is vectored to an angle $\theta$ between about 0° and 90°, the exiting exhaust provides thrust between forward and upward according to the position of the nozzle. Aircraft 10 capable of providing vertical thrust from two locations of the aircraft are referred to as two-poster aircraft. In the present disclosure, two-poster characteristics are present in the upward thrust provided at the aft end 18 of the fuselage 14 by vectoring the nozzle 96 to an angle $\theta$ greater than zero and by the rotor/wing 36. Two-poster aircraft 10 have enhanced flight performance abilities compared to single-poster aircraft because they can operate with a wider variety of centers of gravity by controlling the amount of vertical thrust produced at each poster. For embodiments of the aircraft 10 comprising multiple power plants 32, 34 and corresponding turbine inlets 52, 54 and aft outlets 56, 58, the aircraft may include a separate nozzle (not shown) in fluid communication with each aft outlet.

As shown in FIG. 8, the aircraft 10 also comprises a yaw control system, generally designated by 102, mounted on the airframe 12 adjacent to the aft end 18 of the fuselage 14. The yaw control system 102 is in fluid communication with the power plants 32, 34 for receiving exhaust for actively controlling yaw. Specifically, the yaw control system 102 is operatively connected to the chamber outlet 70 by way of the low-energy conduit 72 for receiving power plant 32, 34 exhaust exiting the radial inflow turbine 48 through the chamber outlet during aircraft 10 operation. The yaw control system 102 may also be operatively connected to the aft outlets 56, 58 for receiving exhaust during aircraft 10 operation. For example, the conduit valve 100 may be configured for selectively diverting exhaust flowing through the high-energy conduit 98 to the low-energy conduit 72 during aircraft 10 operation. Yaw control may be needed to control aircraft 10 yaw during operation in the rotation mode. Although the yaw control system 102 may be other types without departing from the scope of the present disclosure, in one embodiment (not shown) the yaw control system is a NOTAR® system available from the Boeing Company of Chicago, Ill. NOTAR® is a federally registered trademark of the Boeing Company. In one embodiment, the yaw control system 102 includes right and left lateral outlets 104, 106 connected by a valve 108. The yaw control system valve 108 is controlled to selectively direct exhaust received from the low-energy conduit 72 to the right lateral outlet 104, to the left lateral outlet 106, or to both lateral outlets to control 10 yaw during operation of the aircraft 10.

It will be appreciated that additional embodiments in accordance with the present disclosure may be conceived, and that the invention is not limited to the particular embodiments described above and shown in the accompanying figures. For example, aspects of the various embodiments shown in some of the figures may be selectively combined, included, or substituted for various aspects of other embodiments shown in other figures to create still other embodiments. For example, in some embodiments, the aircraft shown in FIG. 5 may be configured to include a vectorable nozzle assembly (e.g. FIG. 4), or pivotable canards (e.g. FIG. 2-4), or a pivotable tail assembly (e.g. FIG. 2-4) to create additional embodiments. Alternately, the vertical tail surfaces of the tail assemblies shown in FIGS. 1-7 may be eliminated and replaced with a single vertical tail that extends generally upwardly from an aft portion of the fuselage to provide further embodiments. The embodiments shown in FIGS. 1-7 may be configured as single engine configurations or multiple-engine configurations. Furthermore, one or more aspects of the embodiments shown in the accompanying figures may be modified or omitted completely to provide still other embodiments in accordance with the present disclosure.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense. Thus, while preferred and alternate embodiments of the disclosure have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An aircraft comprising:
a propulsion system;
a rotor/wing assembly; and
a radial inflow turbine assembly including a radial inflow turbine coupled to the rotor/wing assembly and configured to receive exhaust from the propulsion system during a rotational mode of operation and rotate the rotor/wing assembly, the turbine assembly configured to allow the exhaust to bypass the turbine and provide forward thrust during a second mode of operation.

2. The aircraft according to claim 1 wherein the propulsion system includes at least one engine that produces an exhaust flow, and wherein the radial inflow turbine assembly is configured to extract work from the exhaust flow.

3. The aircraft according to claim 1 wherein the propulsion system includes a vectorable nozzle assembly configured to controllably direct an exhaust flow between an approximately aftward direction and an approximately downward direction.

4. The aircraft according to claim 1, further comprising a yaw control system configured to provide a lateral force by exhausting a portion of an exhaust flow in a lateral direction.

5. The aircraft according to claim 1 further comprising a fuselage; wherein a rotational axis of the rotor/wing assembly extends generally upwardly with respect to the fuselage, and wherein the radial inflow turbine assembly is configured such that a drive portion of an exhaust flow is received into a body along an approximately radial direction with respect to the rotational axis, is deflected by a drive portion, and exits from the body approximately along the rotational axis.

6. The aircraft according to claim 5 wherein the drive assembly further includes a drive shaft projecting upwardly with respect to the fuselage and connected to the rotor/wing assembly; and wherein the radial inflow turbine assembly includes a turbine blade assembly coupled to the drive shaft and including a plurality of vanes that provide a rotational force when subject to the exhaust flow.

7. The aircraft according to claim 1 further comprising a fuselage and canards extending outward laterally from the fuselage; wherein each canard is pivotable between a first position configured to provide a lift force in a fixed-wing mode of operation, and a second position configured to minimize a downward force in a rotary-wing mode of operation.

8. The aircraft according to claim 1 further comprising a tail assembly pivotable between a first tail position configured to provide a lift force in the second mode of operation, and a second tail position configured to minimize a downward force in the first mode of operation.

9. A drive assembly for an aircraft having a propulsion system and a rotor/wing assembly, the drive assembly comprising: a radial inflow turbine assembly operatively coupled to the rotor/wing assembly and to the propulsion system and configured to extract work from the propulsion system to selectively rotate the rotor/wing assembly.

10. The drive assembly according to claim 9 wherein the propulsion system includes at least one engine that produces an exhaust flow, and wherein the radial inflow turbine assembly is configured to extract work from the exhaust flow.

11. The drive assembly according to claim 9 wherein the propulsion system includes at least one engine that produces an exhaust flow, and wherein the rotor/wing assembly rotates about a rotational axis, and wherein the radial inflow turbine assembly is configured such that a drive portion of the exhaust flow is received into a body along an approximately radial direction with respect to the rotational axis, is deflected by a drive portion, and exits from the body approximately along the rotational axis.

12. The drive assembly according to claim 11 wherein the radial inflow turbine assembly is configured to be coupled to the rotor/wing assembly by a drive shaft, and wherein the radial inflow turbine assembly includes a turbine blade assembly configured to be coupled to the drive shaft and including a plurality of vanes that provide a rotational force when subject to the exhaust flow.

13. The drive assembly according to claim 9, further comprising means for allowing the exhaust gas to bypass the turbine and provide forward thrust during a second mode of operation.

14. The aircraft according to claim 1, wherein the turbine assembly further includes a turbine body that forms a vortical chamber; wherein the radial inflow turbine is located in the vortical chamber; and wherein the turbine assembly further includes at least one inlet valve positioned within the body to selectively allow the exhaust to bypass the radial inflow turbine during the first mode and to direct the exhaust into the vortical chamber during the second mode.

15. The aircraft according to claim 1, wherein the turbine is coaxial with a hub of the rotor/wing assembly.

16. The aircraft according to claim 1, wherein the propulsion system includes first and second engines arranged side-by-side, and wherein the turbine assembly includes a housing for the turbine, the turbine housing having first and second inlets in fluid communication with the engines.

17. The aircraft according to claim 1, wherein the radial inflow turbine includes top vane portion and lower vane portion, the top vane portion having greater diameter than lower vane portion; and wherein the turbine assembly further includes a housing that forms a vortical chamber, the housing having an upper housing portion for housing the top vane portion and a lower housing portion for housing the lower vane portion.

18. The aircraft according to claim 17, wherein the housing is configured to direct exhaust gas from the propulsion system into the upper housing portion and then into the lower housing portion.

* * * * *